United States Patent [19]
Wang

[11] Patent Number: 5,955,510
[45] Date of Patent: Sep. 21, 1999

[54] PROCESS FOR THE REGENERATION OF ION EXCHANGE RESINS IN A FIXED DOUBLE-BED TYPE APPARATUS

[76] Inventor: Tingsheng Wang, Room 103, Building 20, Yuechengzhuang, Heze, China

[21] Appl. No.: 08/716,197
[22] PCT Filed: Mar. 30, 1995
[86] PCT No.: PCT/CN95/00021
  § 371 Date: Dec. 23, 1996
  § 102(e) Date: Dec. 23, 1996
[87] PCT Pub. No.: WO95/26821
  PCT Pub. Date: Oct. 12, 1995

[30] Foreign Application Priority Data

Mar. 30, 1994 [CN] China ................... 94240045.3
Dec. 12, 1994 [CN] China ................... 94119829.4

[51] Int. Cl.$^6$ ........................... B01J 49/00
[52] U.S. Cl. ........................ 521/26; 210/670
[58] Field of Search ............... 210/673, 677, 210/685, 279, 289, 290, 670; 521/26

[56] References Cited

U.S. PATENT DOCUMENTS 3,531,401  9/1970  Crits ................................. 210/677
3,582,504  6/1971  Salem et al. .................... 260/2.1
3,617,558  11/1971 Jones .................................. 210/279
3,711,401  1/1973  Hamilton et al. ............... 210/677

Primary Examiner—Ivars Cintins
Attorney, Agent, or Firm—Fulbright & Jaworski

[57] ABSTRACT

The present invention relates to a process for the regeneration of the resins in a fixed double-bed type ion exchange apparatus and the apparatus thereof. Said process of regeneration comprises of following steps: supplying a dilute regeneration solution to flow upwardly to backwash and pre-regenerate the resins; immersing statically the resins with said dilute regeneration solution; supplying a regeneration solution with higher concentration to flow upwardly to further regenerate the resins; supplying water to pass upwardly to replace said concentrated regeneration solution; and finally supplying water to pass downwardly to wash the upper part of upper resin layer, upper resin layer and both resin layers in turn. Said apparatus is characterized in that a lower discharging means for regeneration is disposed around the boundary surface of the two layers of resins.

2 Claims, 1 Drawing Sheet

PROCESS FOR THE REGENERATION OF ION EXCHANGE RESINS IN A FIXED DOUBLE-BED TYPE APPARATUS

FIELD OF THE INVENTION

The present invention relates to a process and apparatus for the regeneration of resins in a water treatment apparatus, particularly to a process and apparatus for the regeneration of ion exchange resins in a fixed double-bed type apparatus, in which the ion exchange resins are of weak type and strong type.

BACKGROUND OF THE INVENTION

Since the double-bed type ion-exchange apparatus for water treatment (hereinafter referred as double-bed) has been developed, its unique advantages have aroused wide concerns. During the application of such double-bed type apparatus, in order to obtain water having good quality after treatment, it is necessary to keep both the strong and weak resins in a state of proper separation, namely the strong and weak resin should possess an adequate difference of wet true density so that they can separate off from each other by hydraulic backwashing and sieving. It is generally required that the difference of wet true density of cation double-bed should be over 0.09 and that of anion double-bed should be in the range of 0.04–0.051. However, after the resins lose their efficacies, the separation of said two layers' resins becomes difficult because the difference of wet true density between them are two small. Especially for those double-bed comprised of anion exchange resin, such problems become more obvious. Therefore, the development and application of this technology are greatly restricte.

With the purpose of solving this technological problem of separating the two layers of ion exchange resins, two processes are disclosed in prior art. One is mechanical partition For example, Japanese Patent Application No. 62-284999 describes a two-chamber fixed double-bed type ion exchange resin apparatus and Japanese Patent Application No. 59-29902 discloses a floating double-bed type apparatus. Both the two apparatuses as described above use a partition disposed between the strong and weak resin layers which only allows liquid to permeate and does not allow the resins to pass therethrough to prevent the intermixing of strong and weak resins. Theoretically, such means can solve the above-mentioned problems, but in practical operation, a washing tower disposed out of the apparatus is needed for cleaning the resins periodically. Since the same system is jointly used for the two types of resins, if the resins are not completely transferred, or resins exist in the dead corner of pipes or in case of inadequate operation and malfunction occurring in intermediate water chamber (e.g. relaxing or breakage of the water valve bonnet), the phenomena of mutual ting between the two types of resins will inevitably arise. Besides, two types of resins in said fixed double-beds can not be effectively compacted, which leads to "layer confusion" during the counter-flowing regeneration and results in an unideal effects of regeneration. Whereas since there is no deep backwash during the regeneration in floating double-bed, thus the organics, suspensions and colloid silica trapped by the resins can not be removed during generation, which result in serious pollution of the resins, decrease of exchanging capacity, serious breakage of resins and no thorough regeneration in upper protecting layer, resulting in unideal results of regeneration, even unqualified regeneration and increase of acid-alkali consumption. In addition, the broken resins blocking in the water valve bonnet of the water chamber causes uneven distribution of water flow and increases the resistance to operation which are unfavorable for operation and regeneration. Furthermore, it is very difficult to clean the resins in the water valve bonnet, it needs an additional resin wiping equipment disposed out of the main body, resulting in further complicated structure of the apparatus, thus increasing equipment investments and space occupation and making regenerating operation more complicated.

Another regeneration process of fixed double-bed type ion exchange resin apparatus in the prior art uses a separation method of hydraulic sieving plus chemical conversion and hydraulic sieving. This method accomplishes effective separation utilizing the fact that the difference of wet true density between two types of resins after resin regeneration being increased But said method needs strong hydraulic backwash each time and needs further strong hydraulic backwash after the completion of regeneration. In this way, it not only increase self-consumption of water, but also makes operation complicated, and it is not favorable for realizing automatic control. In addition, this method also has the problem of "confusion layer" when counter-flowing regeneration method is used. Although co-flow method does not have the problem- of "confusion layer", it has low efficiency of regeneration, inferior water quality after treatment and high specific consumption of regeneration. Furthermore, said method needs larger space for backwashing, thus decreases the degree of space utilization for apparatus.

OBJECTS OF THE INVENTION

Therefore, in order to overcome the shortcomings described above, one object of the present invention is to provide a new process for the regeneration of ion exchange resins in a double-bed type apparatus, which, by means of simultaneous chemical regeneration and hydraulic sieving, can effectively solve the problems of separating two layers in a double-bed and the "confusion layer" during the regeneration of resins, etc. and decreases the space occupied by the apparatus.

Another object of the present invention is to provide a water treatment/resin regeneration apparatus using said regeneration process of the present invention.

DETAILED DESCRIPTION OF THE INVENTION

The present invention relates to a process for the regeneration of the resins in a fixed double-bed type ion exchange resin apparatus, comprising the following steps:

(1) supplying dilute regeneration solution upwardly from the bottom of said double-bed to backwash-pre-regenerate the resins, discharging said solution after regeneration from the top of the apparatus, wherein the concentration of said regeneration solution is 0.1–3% by weight and the flow rate is 3–10 m/h, the amount of regeneration agents used in this step accounts for 10–90% by weight of the total amount of the regeneration agents as used;

(2) keeping said regeneration solution the apparatus statically for 1–30 minutes after said dilute regeneration solution for pre-regeneration has been completely supplied;

(3) supplying the remained regeneration solution upwardly from the bottom to the top of the apparatus to regenerate the resins, dischargng said solution after regeneration from the upper portion of the upper resin layer in the apparatus, wherein the concentration of said regeneration solution is 1–10% by weight and the flow gate thereof is 2–6 m/h;

(4) supplying pure water upwardly from the bottom of the double-bed to the top to replace the regeneration solution for 20–60 minutes;

(5) supplying water downwardly to wash firstly the resins in the upper portion or the upper resin layer and discharging the used water after wash from the upper portion of the upper resin layer, then in the same manner, washing the resin of the upper resin layer and discharging the used water from a location around the boundary surface of the upper resin layer and the lower resin layer, and finally washing the whole double-bed resin.

According to the process of the present invention, in which the regenerating process in step (3) can be conducted with or without the presence of top pressure.

The present invention also relates to a fixed double-bed type ion exchange resin generating/treating apparatus for water treatment using the regeneration process of the present invention, which comprises: devices for supplying and discharging water disposed at the top and at the bottom of the apparatus respectively, casing, upper discharging means used for regeneration, weak acidic (basic) resin layer and strong acidic (basic) resin layer, characterized in that a lower discharging means used for regeneration is disposed around the boundary surface of the two resin layers inside the casing.

Compared with the prior art, the process and apparatus of the present invention for the regeneration of double-bed type ion-exchange resin have the following advantages:

Firstly, due to the high flow rate and low concentration of the regeneration solution used for the regeneration process of the present invention, the backwashing, regenerating and separating of the resins can be carried out simultaneously, with the results of simplifying operation procedures, saving water for backwashing, decreasing the amount of self-consumption of water and the amount of waste water being discharged. Furthermore, the density of waste regenerating solution is higher than that of water, allowing suspensions and broken resins be removed more easily with a better results of backwashing Secondly, during said pre-regenerating step the weak type resins are regenerated first, and the strong type resins are mostly still keep its non-regenerating state, so that the difference of wet true density between the two types of resins is increased, resulting better effects of resins separation.

Thirdly, due to the steps of statically regeneration prior to counter-flow regeneration, the phenomena of confusing layer and deviating flow in resins can be limited during the later period of regeneration, improving the regeneration degree of resins and the exchange volume of operation.

Fourthly, the expansion space for backwashing of double-bed type apparatus can be decreased by use of the regeneration process of the present invention, improving the space utilization of the apparatus.

Fifthly, an additional lower discharging means in accordance with the present invention enables to take a stepwise washing procedure, improving the quality of water after treatment, saving the amount of water consumed during the regeneration and also saving the time for washing.

Sixthly, the upper discharging means is disposed at a place 100–200 mm below the surface of the upper resin layer, and its relative height increases along with the increase of the space occupied by the resins.

Seventhly, no hydraulic backwashing pipe system is attached beyond the main body of the apparatus of the present invention, resulting in simplified system and easier realization of program control and automation.

Figure 1:
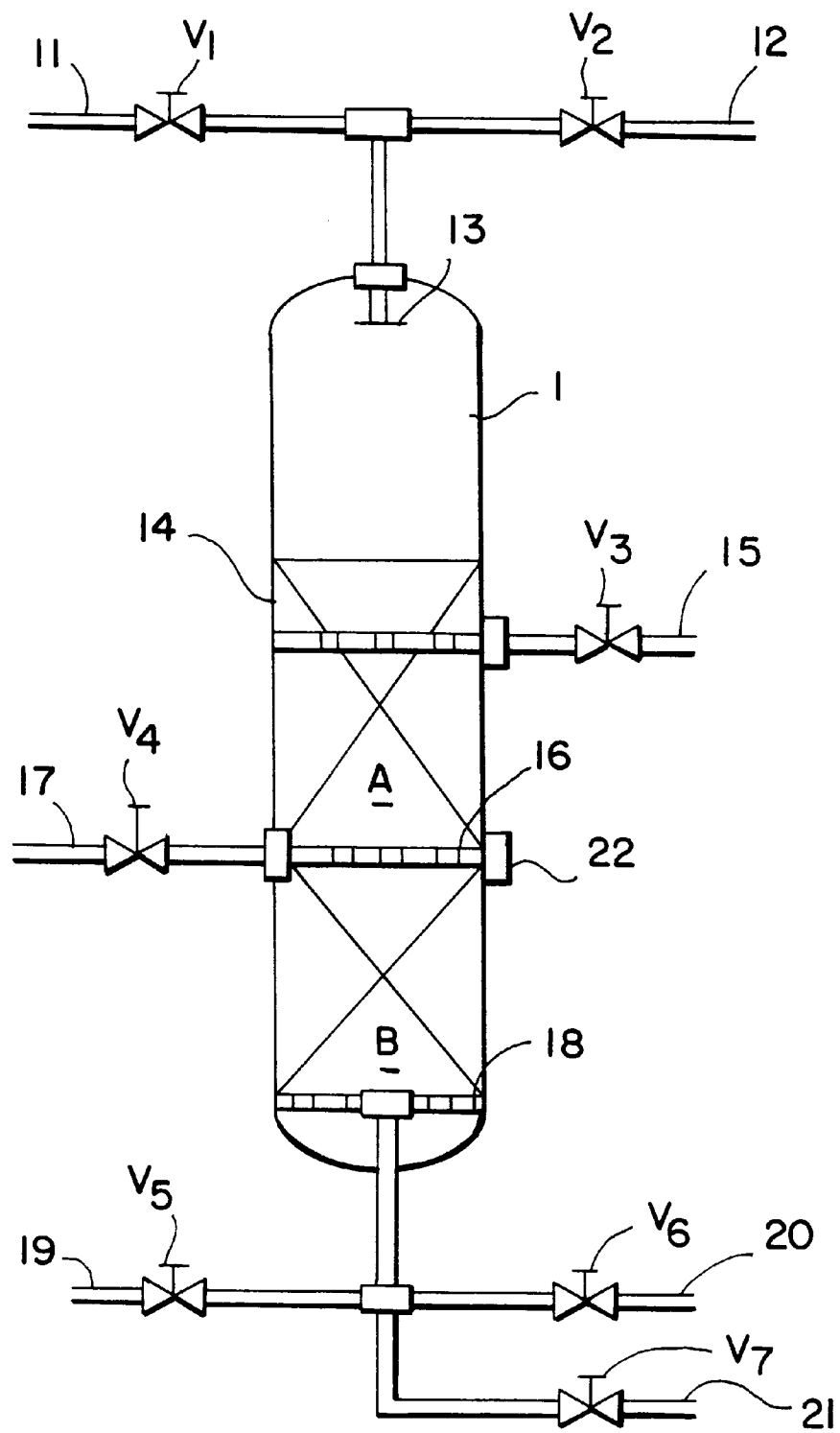
FIG. 1 shows a sketch view of the fixed double-bed type ion exchange resin regeneration/water treatment apparatus according to the present invention.

The present invention will be described in detail hereafter according to the accompanying drawing and Examples.

As shown in FIG. 1, the fixed double-bed type ion exchange resin regeneration/water treatment apparatus according to the present invention comprises casing 1, water inlet pipe 11, inlet valve V1 and distributor system 13 which are disposed at the top of the apparatus; top discharging pipe 12 and top discharging valve V2 which are disposed at the top of the apparatus for discharging waste solution after regeneration; weak type ion exchange resin (layer) A disposed at an upper portion of casing 1 as upper layer and strong type ion exchange resin (layer) B disposed at a lower portion of casing 1 as a lower layer; an upper discharging pipe 15 on which an upper discharging valve V3 is provided, which is disposed at the upper portion of upper layer A and connects with an upper discharging distributor system 14 disposed in layer A; a lower discharging pipe 17 on which a lower discharging valve V4 is installed, which is disposed around the boundary surface of said layer A and layer B and connects with a lower discharging distributor system 16 disposed in layer B; inlet pipe 19, inlet valve V5 and distributor system 18 of regeneration solution which are disposed at the bottom of the apparatus in order to introduce the regeneration solution passing through said layers A and B; regeneration solution bottom discharging pipe 21 and bottom discharging valve V7 and water outlet pipe 20 and water outlet value V6.

The apparatus according to the present invention is characterized in that a lower discharging means for the regeneration is set around the boundary surface of the strong and weak resins, namely at a place of 200 mm above the bottom surface of strong type resin layer B and 200 mm below the top surface of weak type resin layer B. The total loading height of resin in the apparatus of the present invention is generally in the range of 10–35 m, accounting for 50–90% of the total height of the cylinder part of the apparatus, of which the height of week type resin layer A is in the range of 0.5–3.0 m and the height of strong type resin layer B is in the range of 3.0–0.5 m.

The apparatus of the present invention saves backwashing system beyond main body, enables the regeneration pipe system to carry out backwashing procedure by taking advantages of the regeneration process of the present invention, thus resulting in the decrease of apparatus investments and space occupation, and good water quality after treatment.

Furthermore, in order to survey the effects of separation, a pipe hole 22 can be additionally set around the boundary surface of the two types of resins, and in order to supervise the quality of water after treatment, a water sampling device can also arranged around the boundary surface of resins (not shown in the drawing).

The process for the regeneration of the resins in a fixed double-bed type ion exchange apparatus according to the present invention comprises the following steps.

Firstly, open top discharge valve V2 and inlet valve V5 to supply a dilute regeneration solution via pipe 19 to pass it through strong resin layer B and weak resin layer A at a relatively high speed to backwash, separate and pre-regenerate the inactivated resins, the regeneration agents used are those currently used in prior art with a concentration of 0.1–3% by weight and a flow rate of 3–10 m/h. The amount of regenerating agents as used during the pre-regenerating process accounts for 10–90% of the total amount of the regenerating agents as used.

This step has three effects of backwash, separation and pre-regeneration simultaneously. According to the characteristics of weak type resin and that of strong type resin, the former is easier to be regenerated than the latter. That is, the weak type resin is firstly converted into regeneration type, the wet true density of which in this case approaches to a minimum state, while most of the strong type resin keeps at inactivated state, namely in a state of maximum wet true density, thus making maximum difference of wet true density between strong and weak resins, resulting in most complete separation.

Secondly, close valves V2 and V5, stop supplying regeneration solution, and discharging waste regeneration solution, enabling it to be kept statically in the double-bed for 1–30 minutes for immersing the resins, resulting in the further regeneration of weak type resins so that the volume of the weak resins is further contracted and sedimented. At the same time, the volume of the strong type resin expands after regeneration with an expansion height capable of filling in the space resulted from the further contraction of weak type resin, causing the pressing resin layer above upper discharge system 15 to exert an effect of top pressing with the results of preventing layer confusing between resin layers and creating good compaction condition for further regeneration with or without top pressure.

Thirdly, open upper discharging valve V3 to carry out counter-flowing regeneration of resins by using regeneration solution with a known regenerating flow rate and concentration, of which the concentration of regeneration solution is 1–10% by weight and the flow rate is 2–6 m/h.

According to the present intention, in the third step, the counter-flow regeneration can be conducted without top pressing. This can save the water consumption during water top pressing or save the amount of air needed to press during air pressing. Of course, this step can also be conducted by conventional top pressing method.

Fourthly, after the supplying of regenerating solution has been completed, pure water is introduced continuously via pipe 19 to carry out counter-flow replacement washing for 20–60 minutes.

Fifthly, wash the resin layer stepwisely by water At first, open water fillet valve V1. When the upper air has been completely exhausted, open upper discharging valve V3 to wash the upper layer resins (referred to as small washing) with a flow rate of 5–15 m/h and a duration of 1–20 minutes. Then open lower discharging valve V5 and at the same time, close valve V3 to wash intermediate resin layer (referred so as intermediate washing) with a f low rate of 5–15 m/h and a duration of 5–60 minutes Finally, open bottom discharging valve V7 and at the same time, close valve V4 to wash the both resin layers (referred to as deep washing) with a flow rate of 10–30 m/h and a duration of 5–30 minutes.

In this step, resin layers are washed stepwisely, enabling the resin layers cleaned more thoroughly, particularly for the pollutants absorbed in intermediate resin layer, resulting in an improved quality of water after treatment and more economical water consumption for washing.

BEST MODE FOR CARRYING OUT THE INVENTION

The present invention will be further explained by the following examples. It should be understood that the present invention is no limited by these examples.

EXAMPLE 1

A double-bed type cation exchange column having a diameter of 2 m with a cylinder part having a height of 3 m and a total resin height ot 2 m is used, in which 001X7-SF strongly acidic cation-exchange resin having a height of 1.1 m and D113-SC weakly acidic cation-exchange resin hating a height of 0.9 m were loaded.

According to the process described above, by using industrial hydrochloric acid as regeneration agent, 0.9 $m^3$ of industrial hydrochloric acid was prepared into an aqueous solution with a concentration of 1.0% by weight as a pre-regeneration solution. Said solution was flowed upwardly to backwash, separate and pre-generate the resins in said column at a flow rate of 7 m/h. After the supplying of the pre-regeneration solution had been completed, it was kept statically for 20 minutes. Then 0.9 $m^3$ of industrial hydrochloric acid was diluted to prepare an aqueous regeneration solution with a concentration of 2.2% by weight to regenerate said resins in the column at a flow rate of 4 m/h. After the supplying of said regenerating solution had been completed, water was continuously supplied to replace the regeneration solution for 30 minutes. Finally, the resins were washed downwardly by water, including the mall washing with a flowing rate of 10 m/h for 5 minutes, intermediate wasting with a flowing rate of 10 m/h for 13 minutes and deep washing with a flowing rate of 25 m/h for 7 minutes, the specific regeneration loss ratio was 1.1.

EXAMPLE 2

A double-bed type anion exchange column having a diameter of 2 m with a cylinder part having a height of 3 m and a total resin height of 2 m, in which 201X7-SF strongly basic anion exchange resin having a height of 0.9 m and D301-SC weakly basic anion-exchange resin having a height of 1.1 m were load.

According to the same procedure described in Example 1, industrial caustic soda was used as regeneration agent 0.4 $m^3$ of industrial caustic soda was diluted to prepare an aqueous solution with a concentration of 0.9% by weight as the pre-regeneration solution. Said solution was supplied to flow upwardly to backwash, separate and pre-regenerate the resins in said column at a flow rate of 5.5 m/h. After the supplying of the pre-regeneration solution had been completed, it was kept statically in the column for 25 minutes. Then 0.3 $m^3$ of industrial caustic soda was diluted to prepare an aqueous regeneration solution with a concentration of 2.0% by weight to regenerate said resins in the column at a flow rate of 3 m/h. After the supplying of the regenerating solution had been completed, water was continuously supplied to replace the regeneration solution for 30 minutes. Finally, the resins were washed downwardly by water, including the small washing with a flow rate of 10 m/h for 5 minutes, intermediate washing with a flow rate of 10 m/h for 15 minutes and deep washing with a flow rate of 20 m/h for 8 minutes, the specific regeneration loss ratio was

EXAMPLE 3

A double-bed type cation exchange column having a diameter of 2.2 m with a cylinder part having a height of 4 m and a total resin height of 2.6 m was used, in which 001X7-SP strongly acidic cation-exchange resin having a height of 1.2 m and D113-SC -weakly acidic cation-exchange resin having a height of 1.4 m were loaded. A lower discharging means was provided at a location of 0.2 m above the boundary surface of the resins.

According to the same procedure described in Example 1, industrial hydrochloric acid was used as regeneration agent, 1.3 m³ of industrial hydrochloric acid was diluted to prepare an aqueous solution with a concentration of 1.0% by weight as the pre-regeneration solution. Said solution was supplied to flow upwardly to backwash, separate and pre-regenerate the resins in said column at a flow rate of 7.5 m/h. After the supplying of the pre-regeneration solution had been completed, it was kept statically in the column for 25 minutes- Then 1.2 m³ of industrial hydrochloric acid was diluted to prepare an aqueous regeneration solution with a concentration of 2% by weight to regenerate said resins in the column at a flow rate of 4 m/h. After the supplying of the regenerating solution had been completed, water was continuously supplied to replace the aqueous regeneration solution for 40 minutes. Finally, the resins were washed downwardly by water, including the small washing with a flow rate of 10 m/h for 5 minutes, intermediate washing with a flow rate of 10 m/h for 20 minutes and deep washing with a flow rate of 25 m/h for 10 minutes, the specific regeneration loss ratio was 1.05.

EXAMPLE 4

Use water from river as water source.

A double-bed type anion exchange column having a diameter of 2.5 m with a cylinder part having a height of 4 m and a total resin height of 2.58 m was used, in which 201X7-SF strongly basic anion-exchange resin having a height of 1.0 m and D301-SC weakly basic anion-exchange resin having a height of 1.58 m were loaded. A lower discharging means was provided around the boundary surface of the resins.

According to the same procedure described in Example 1, industrial caustic soda was used as regeneration agent 0.6 m³ of industrial caustic soda was diluted to prepare an aqueous solution with a concentration of 0.9% by weight as the pre-regeneration solution. Said solution was supplied to flow upwardly to backwash; separate and pre-regenerate the resins in said column at a flow rate of 5 m/h. After the supplying of the pre-regeneration solution had been completed, it was kept statically in the column for 15 minutes Then 0.5 m³ of industrial caustic soda was diluted to prepare an aqueous regeneration solution with a concentration of 2.0% by weight to regenerate said resins in the column at a flow rate of 3.5 m/h. After the supplying of the regenerating solution had been completed, water was continuously supplied to replace the regeneration solution for 25 minutes. Finally, the resins were washed downwardly by water, including the small washing with a flow rate of 10 m/h for 5 minutes, intermediate washing with a flow rate of 10 m/h for 15 minutes and deep washing with a flow rate of 20 m/h for 5 minutes, the specific regeneration loss ratio was 1.25 and COD removal ratio was 61% and a COD regeneration elusive ratio was 98%.

EXAMPLE 5

Use earth's surface water as water source.

A double-bed type cation exchange column having a diameter of 2 m with a cylinder part having a height of 3.2 m and a total resin height of 2.0 m was used, in which 001X7-SP strongly acidic cation-exchange resin having a height of 1.45 m and D113-SC weakly acidic cation-exchange resin having a height of 0.55 m were loaded. A lower discharging means was provided at a location of 0.5 m below the boundary surface of the resins According to the same procedure described in Example 1, industrial concentrated sulfuric acid was used as regeneration agent 0.5 m³ of industrial concentrated sulfuric acid was diluted to prepare an aqueous solution with a concentration of 1.0% by weight as pre-regeneration solution. Said solution was supplied to flow upwardly to backwash, separate and pre-regenerate the resins in said column at a flow rate of 8 m/h. After the supplying of the pre-regeneration solution had been completed, it was kept statically in the column for 5 minutes Then 0.5 m³ of industrial concentrated sulfuric acid was diluted to prepare an aqueous regeneration solution with a concentration of 2% by weight to regenerate the resins in said column at a flow rate of 4 m/h. After the supplying of the regeneration solution had bee completed, water was continuously supplied to replace the regeneration solution for 30 minutes. Finally, the rests were washed downwardly by water, including the small washing with a flow rate of 10 m/h for 5 minutes, intermediate washing with a flow rate of 10 m/h for 12 minutes and deep washing with a flow rate of 25 m/h for 5 minutes, the specific regeneration loss ratio was 1.1.

EXAMPLE 6

Use earth's surface water as water source.

A double-bed type anion exchange column having a diameter of 2.0 m with a cylinder part having a height of 5 m and a total resin height of 3.2 m was used, in which 201X7-SF strongly basic anion-exchange resin having a height of 14 m and D301-SC weakly basic onion-exchange resin having a height of 18 m were loaded. A lower discharging means was provided at a location of 0.4 m below the boundary surface of the resins.

According to the same procedure described in Example 1, industrial caustic soda was used as regeneration agent. 0.5 m³ of industrial caustic soda was diluted to prepare an aqueous solution with a concentration of 1.0% by weight as the pre-regeneration solution. Said solution was supplied to flow upwardly to backwash, separate and pre-regenerate the resins in said column at a flow rate of 6.5 m/h. After the supplying of the pre-regeneration solution had been completed, it was kept statically in the column for 15 minutes. Then 0.55 m³ of industrial caustic soda was diluted to prepare an aqueous regeneration solution with a concentration of 2.0% by weight to regenerate said resins in the column at a flow rate of 4 m/h. After supplying of the regenerating solution had been completed, was continuously supplied to replace the regeneration on for 50 minutes. Finally, the resins were washed down by water, including the small washing with a flow race of 10 m/h for 5 minutes, intermediate was flowing with a flow rate of 10 m/h for 35 minutes and deep washing with a flow rate of 25 m/h for 8 minutes, the specific regeneration loss ratio was 1.20 and COD removal ratio was 68% and a COD regeneration elusive ratio was 99%.

Industrial Applicability of the Invention

The process and apparatus for the regeneration of ion exchange resins in a fixed double-bed type apparatus of the present invention can be used in the ion-exchange water treatment field.

What I claimed is:

1. A process for the regeneration of the resins in a fixed double-bed type ion exchange resin apparatus having an upper resin layer selected from the group consisting of a weak acidic resin layer and a weak basic resin layer, said upper resin layer having an upper portion, and lower resin layer selected from the group consisting of a strong acidic resin layer and a strong basic resin layer, comprising the steps of (1) supplying a dilute regeneration solution comprising at least one regeneration agent to flow upwardly from the bottom of said double-bed apparatus to backwash-pre-regenerate said upper resin layer and said lower resin layer, and discharging said regeneration solution from the top of the apparatus, wherein the concentration of said regeneration agent in said regeneration solution is from 0.1–3% by weight and the flow rate thereof is 3–10 m/h and wherein the amount of said regeneration agent used in this step is 10–90% by weight of the total amount of said regeneration agent;

(2) stopping the discharge of the regeneration solution after said 10–90% of the regeneration agent is supplied and statically keeping the remaining regeneration solution in the apparatus for 1–30 minutes;

(3) causing said remaining regeneration solution to flow upwardly from the bottom of the apparatus to the top of the apparatus to regenerate said upper resin layer and said lower resin layer, and discharging the used remaining regeneration solution from the upper portion of said upper resin layer in the apparatus, wherein the concentration of said regeneration agent in said regeneration solution is 1–10% by weight and the flow rate is 2–6 m/h;

(4) flowing pure water upwardly from the bottom of the double-bed apparatus to the top of the double-bed apparatus for 20 to 60 minutes to replace the regeneration solution; and subsequently (5) flowing pure water downwardly through the apparatus to wash firstly the resins in the upper portion of said upper resin layer and discharging the used water therefrom, then washing said upper resin layer with water and discharging the used water from a location 200 mm above the boundary surface of the upper resin layer and 200 mm below the surface of the lower resin layer, and finally washing the whole double-bed apparatus with water.

2. The regeneration process of claim 1, wherein backwashing said lower resin layer and said upper resin layer is carried out simultaneously with the pre-regeneration of said upper resin layer and said lower resin layer.

* * * * *

UNITED STATES PATENT AND TRADEMARK OFFICE
CERTIFICATE OF CORRECTION

PATENT NO. : 5,955,510
DATED : Sep. 21, 1999
INVENTOR(S) : Tingsheng Wang

It is certified that error appears in the above-identified patent and that said Letters Patent is hereby corrected as shown below:

In column 3, line 48, insert -- in -- after "resulting"
In column 3, line 50, change "statically" to -- statical --.
In column 3, line 33, change "Firstly" to -- First --.
In column 3, line 44, change "Secondly" to -- Second --.
In column 3, line 50, change "Thirdly" to -- Third --.
In column 3, line 55, change "Fourthly" to -- Fourth --.
In column 3, line 59, change "Fifthly" to -- Fifth --.
In column 3, line 64, change "Sixthly" to -- Sixth --.
In column 4, line 1, change "Seventhly" to -- Seventh --.

In column 3, line 45, delete "still"
In column 3, line 45, change "its" to -- in their --.
In column 4, line 60, change "also arranged" to -- also be arranged --.
In column 4, line 65, change "Firstly" to -- First --.
In column 5, line 18, change "Secondly" to -- Second --.
In column 5, line 32, change "Thirdly" to -- Third --.

UNITED STATES PATENT AND TRADEMARK OFFICE
CERTIFICATE OF CORRECTION

PATENT NO. : 5,955,510
DATED : Sep. 21, 1999
INVENTOR(S) : Tingsheng Wang

It is certified that error appears in the above-identified patent and that said Letters Patent is hereby corrected as shown below:

In column 4, line 44, change "10-35" to -- 1.0-3.5 m --.
In column 5, line 51, change "V5" to -- V4 --.
In column 8, line 29, change "14" to -- 1.4 --.
In column 1, line 16, insert -- to -- after "referred"
In column 1, line 30, change "two" to -- to --.
In column 1, line 33, change "restricte" to -- restricted --.
In column 1, line 36, change "partition" to -- partition. --.
In column 1, line 41, change "Both the" to -- Both of the --.

In column 2, line 8, change "operation" to -- operations --.
In column 2, line 16, change " increased But" to -- increased. But --.
In column 2, line 19, change "increase" to -- increases --.
In column 2, line 24, change "problem-" to -- problem --.
In column 3, line 3, change "gate" to -- rate --.
In column 3, line 42, insert -- to -- after "resins".
In column 3, line 43, change "backwashing" to -- backwashing. --.

UNITED STATES PATENT AND TRADEMARK OFFICE
CERTIFICATE OF CORRECTION

PATENT NO. : 5,955,510
DATED : Sep. 21, 1999
INVENTOR(S) : Tingsheng Wang

It is certified that error appears in the above-identified patent and that said Letters Patent is hereby corrected as shown below:

In column 5, line 42, change "Fourthly" to -- Fourth --.
In column 5, line 46, change "Fifthly" to -- Fifth --.
In column 5, line 46, change "water" to -- water. --.
In column 5, line 53, change "f low" to -- flow --.
In column 5, line 55, change "wash the" to -- wash --.
In column 5, line 59, change "layers cleaned" to -- layers to be cleaned --.
In column 5, line 67, change "no" to -- not --.
In column 6, line 5 change "hating" to -- having --.
In column 6, line 23, change "mall" to -- small --.
In column 6, line 25, change "wasting" to -- washing --.
In column 6, line 64, change "-weakly" to -- weakly --.
In column 7, line 10, change "minutes-Then" to -- minutes. Then --.
In column 7, line 67, change "resins" to -- resins. --.
In column 8, line 10, change "minutesThen" to -- minutes. Then --.
In column 8, line 29, change "onion" to -- anion --.
In column 8, line 47, change "completed, was" to -- completed, water was --.
In column 8, line 48, change "on" to -- solution --.

UNITED STATES PATENT AND TRADEMARK OFFICE
CERTIFICATE OF CORRECTION

PATENT NO. : 5,955,510
DATED : Sep. 21, 1999
INVENTOR(S) : Tingsheng Wang

It is certified that error appears in the above-identified patent and that said Letters Patent is hereby corrected as shown below:

In column 8, line 50, change "race" to -- rate --.
In column 8, line 51, change "was flowing" to -- washing --.

Signed and Sealed this

Sixth Day of March, 2001

Attest:

NICHOLAS P. GODICI

Attesting Officer

Acting Director of the United States Patent and Trademark Office